(12) United States Patent
Saito et al.

(10) Patent No.: US 12,097,813 B2
(45) Date of Patent: Sep. 24, 2024

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/990,348

(22) Filed: Nov. 18, 2022

(65) Prior Publication Data
US 2023/0166676 A1     Jun. 1, 2023

(30) Foreign Application Priority Data

Nov. 26, 2021   (JP) ................... 2021-192260

(51) Int. Cl.
*B60R 16/02*     (2006.01)
*H02G 3/32*      (2006.01)
*H01B 7/40*      (2006.01)

(52) U.S. Cl.
CPC ........... *B60R 16/0215* (2013.01); *H02G 3/32* (2013.01); *H01B 7/40* (2013.01)

(58) Field of Classification Search
CPC .. H02G 3/04; H02G 3/30; H02G 3/32; H02G 3/40; H02G 3/0418; H02G 3/0462; H02G 3/0481; B60R 16/0207; B60R 16/0215; H01B 7/0045
USPC ................. 248/68.1, 73, 74.1–74.4
See application file for complete search history.

(56) References Cited

U.S. PATENT DOCUMENTS

| | | | | |
|---|---|---|---|---|
| 5,560,397 A | * | 10/1996 | Miller | H02G 3/22 138/110 |
| 6,110,172 A | * | 8/2000 | Jackson | A61B 17/7032 606/305 |
| 7,758,274 B2 | * | 7/2010 | Paul | A61B 17/00 403/104 |
| 11,306,764 B1 | * | 4/2022 | Spriggel | F16B 39/16 |
| 2007/0140406 A1 | * | 6/2007 | Mazuy | G21C 13/032 376/327 |
| 2012/0228458 A1 | * | 9/2012 | Hauser | F16B 5/0685 248/309.1 |

FOREIGN PATENT DOCUMENTS

| | | |
|---|---|---|
| JP | 2006-046508 A | 2/2006 |
| JP | 2009038899 A * | 2/2009 |

* cited by examiner

*Primary Examiner* — Paresh Paghadal
(74) *Attorney, Agent, or Firm* — Oliff PLC

(57) ABSTRACT

A wire harness, including: an electric wire; and a fixing member for fixing the electric wire to an attachment object, wherein: the fixing member includes a bolt fixed portion that is fixed to a bolt included in the attachment object and a holder for holding the electric wire, the bolt fixed portion includes a fixed portion main body having an insertion hole into which the bolt is inserted and a lock ring fixed to the bolt by locking, in an axial direction, to a threaded portion of the bolt disposed in the insertion hole, the insertion hole includes a movement restrictor for restricting relative movement of the lock ring in the axial direction of the bolt, and the lock ring is configured to be movable in the insertion hole in a direction orthogonal to an axis of the bolt.

5 Claims, 4 Drawing Sheets

WIRE HARNESS

BACKGROUND

The present disclosure relates to wire harnesses.

The wire harness of JP 2006-46508A includes a fixing member that fixes electric wire members to a vehicle body. The fixing member includes holder portions that hold the electric wire members and a bolt fixed portion that is fixed to a bolt provided on the vehicle body. The bolt fixed portion includes locking pieces that lock to the threaded portion of the bolt in the axial direction. At least a pair of locking pieces is provided to pinch the bolt in a direction orthogonal to the axis of the bolt. To attach the fixing member to the bolt, the bolt is inserted into the fixing member. During this process, the locking pieces are pushed by the bolt to bend away from each other. Subsequently, the locking pieces are biased toward the bolt by their own elasticity and lock to the threaded portion of the bolt.

SUMMARY

Due to the displacement of the wire harness path, etc., the position of the fixing member with respect to the bolt on the vehicle may be displaced in the direction in which the paired locking pieces oppose each other. In this case, as the bolt is moved closer to one of the paired locking pieces, the locking between the locking pieces and the bolt may become unstable, or the locking pieces may no longer be able to lock to the bolt. As a result, it may not be possible to fix the fixing member to the bolt, or even if it is possible to fix the fixing member to the bolt, the locking between the locking pieces and the bolt may be so unstable that the fixing member may be detached from the bolt.

An exemplary aspect of the disclosure provides a wire harness capable of stabilizing the fixing of a fixing member to a bolt.

A wire harness of the present disclosure includes: an electric wire; and a fixing member for fixing the electric wire to an attachment object, wherein: the fixing member includes a bolt fixed portion that is fixed to a bolt included in the attachment object and a holder for holding the electric wire, the bolt fixed portion includes a fixed portion main body having an insertion hole into which the bolt is inserted and a lock ring fixed to the bolt by locking, in an axial direction, to a threaded portion of the bolt disposed in the insertion hole, the insertion hole includes a movement restrictor for restricting relative movement of the lock ring in the axial direction of the bolt, and the lock ring is configured to be movable in the insertion hole in a direction orthogonal to an axis of the bolt.

According to the wire harness of the present disclosure, it is possible to stabilize the fixing of a fixing member to a bolt.

DETAILED DESCRIPTION OF EMBODIMENTS

Figure 1:
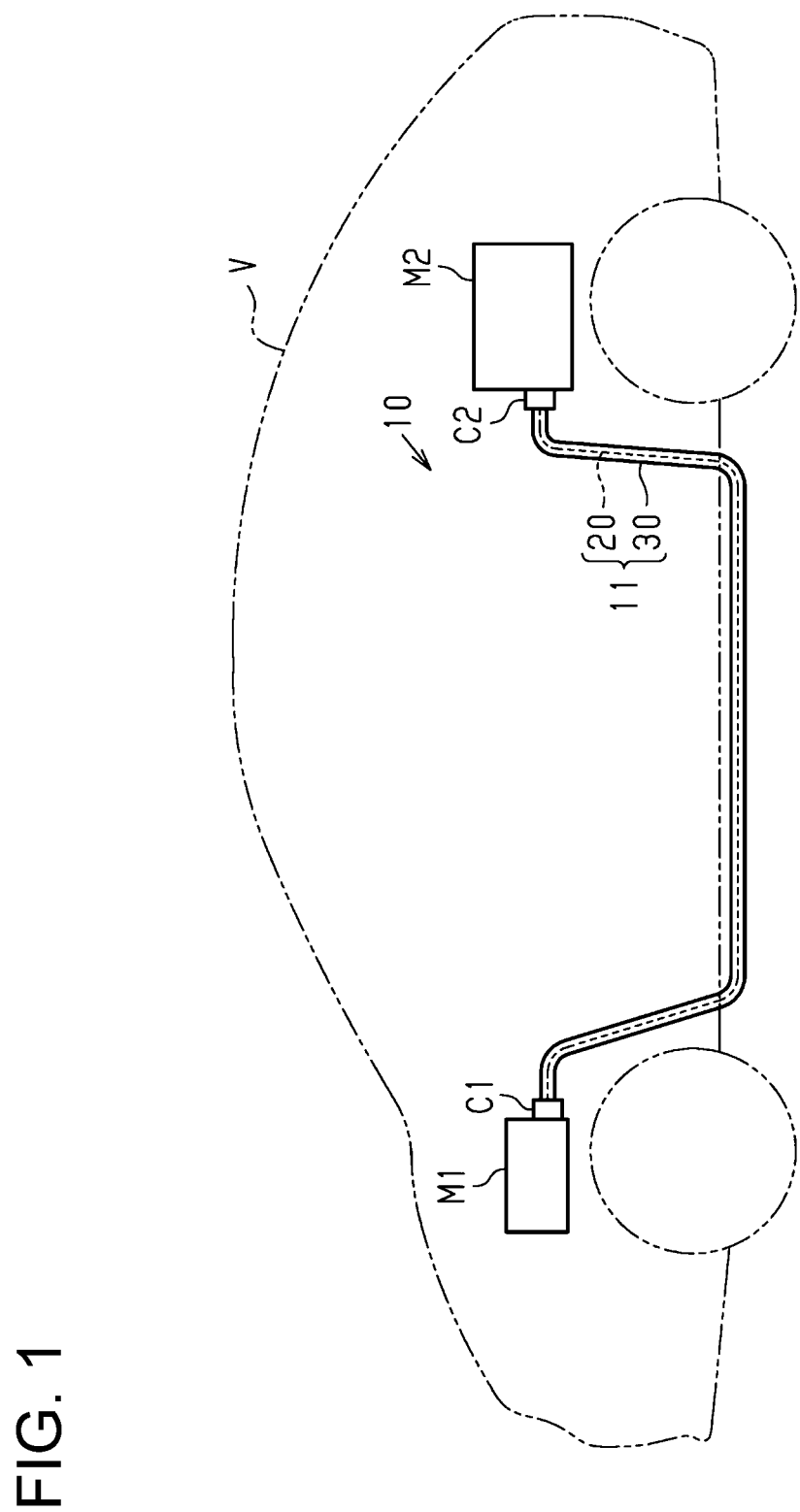
FIG. 1 is a schematic configuration diagram showing a wire harness according to an embodiment.

Description of Embodiments of the Present Disclosure

First, embodiments of the present disclosure will be listed and described.

A wire harness of the present disclosure is

[1] a wire harness including: an electric wire member having an electric wire; and a fixing member for fixing the electric wire member to an attachment object, in which the fixing member includes a bolt fixed portion that is fixed to a bolt included in the attachment object and a holder portion for holding the electric wire member, the bolt fixed portion includes a fixed portion main body having an insertion hole into which the bolt is inserted and a lock ring fixed to the bolt by locking, in an axial direction, to a threaded portion of the bolt disposed in the insertion hole, the insertion hole includes a movement restricting portion for restricting relative movement of the lock ring in the axial direction of the bolt, and the lock ring is configured to be movable in a direction orthogonal to an axis of the bolt in the insertion hole.

According to this configuration, the lock ring fixed to the bolt is restricted from relative movement in the axial direction of the bolt by the movement restricting portion, and therefore the bolt can remain inserted in the insertion hole. Additionally, the lock ring is configured to be movable in a direction orthogonal to the axis of the bolt in the insertion hole. That is, the bolt and the lock ring are allowed to move relative to the fixing member in the direction orthogonal to the axis. Therefore, even if the position of the fixing member is displaced with respect to the bolt in the direction orthogonal to the axis of the bolt due to the displacement of the path of the wire harness, or the like, it is possible to stabilize the fixing of the fixing member to the bolt.

[2] The lock ring is configured to be movable in the insertion hole both in a first direction orthogonal to the axial direction of the bolt and a second direction orthogonal to the axial direction of the bolt and the first direction.

According to his configuration, positional displacement between the bolt and the fixing member in the first and second directions orthogonal to the axial direction of the bolt can be allowed. Therefore, it is possible to further stabilize the fixing of the fixing member to the bolt.

[3] The fixed portion main body includes a ring insertion hole that is in communication with the insertion hole and into which the lock ring is insertable.

Due to this configuration, the lock ring can be inserted into the insertion hole via the ring insertion hole so as to be fixed to the bolt in the insertion hole.

[4] The lock ring is formed in a C-shape as seen in the axial direction of the bolt.

According to this configuration, the lock ring can be easily attached to the bolt.

[5] The wire harness of the present disclosure further includes an exterior member covering an outer circumference of the electric wire member, and a path restricting member that is attached to an outer circumference of the exterior member and restricts a path of the exterior member, in which the path restricting member has an insertion port that is open in a direction orthogonal to a lengthwise direction of the path restricting member and extends over an entire length in the lengthwise direction of the path restricting member. According to this configuration, it is possible to prevent damage to biasing portions of the bolt fixed portion in the wire harness, which includes the path restricting member.

[6] The holder portion holds the path restricting member in a manner covering an entire circumference of the path restricting member, wherein the holder portion includes a projection protruding on an inner circumference, and the projection is positioned inside of the insertion port. According to this configuration, the projection of the holder portion can restrict the rotation of the path restricting member relative to the holder portion.

Details of Embodiments of the Present Disclosure

Specific examples of the wire harness of the present disclosure will be described below with reference to the drawings. In each drawing, for convenience of description, portions of the configuration may be exaggerated or simplified. Also, the dimensional proportion of each portion may differ in each drawing. Moreover, the term "orthogonal" as used herein includes not only the case of being strictly orthogonal, but also the case of being approximately orthogonal within the range in which the actions and effects of the present embodiment are exhibited.

Note that the term "opposing" as used herein refers to surfaces or members being in positions that are in front of each other, and includes not only the case where they are in positions that are completely in front of each other, but also the case where they are in positions that are partially in front of each other. Furthermore, the term "opposing" as used herein includes both the case where another portion is interposed between two portions and the case where no other portion is interposed between the two portions.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 is formed in an elongated shape so as to extend in a front-rear direction of the vehicle V, for example. The wire harness 10 is routed in the vehicle V so that, for example, an intermediate portion in the lengthwise direction of the wire harness 10 passes outside the vehicle interior, such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to a motor. The high-voltage battery M2 is, for example, a battery that is capable of supplying a voltage of several hundred volts.

The wire harness 10 includes a wire harness main body 11. The wire harness main body 11 includes an electric wire member 20 and a tubular exterior member 30 (exterior tube) that covers the outer circumferential surface of the electric wire member 20. The wire harness 10 has connectors C1 and C2 that are respectively attached to two end portions of the electric wire member 20. One end portion in the lengthwise direction of the electric wire member 20 is connected to the inverter M1 via the connector C1, and the other end portion in the lengthwise direction of the electric wire member 20 is connected to the high-voltage battery M2 via the connector C2.

Configuration of Electric Wire Member 20

Figure 2:
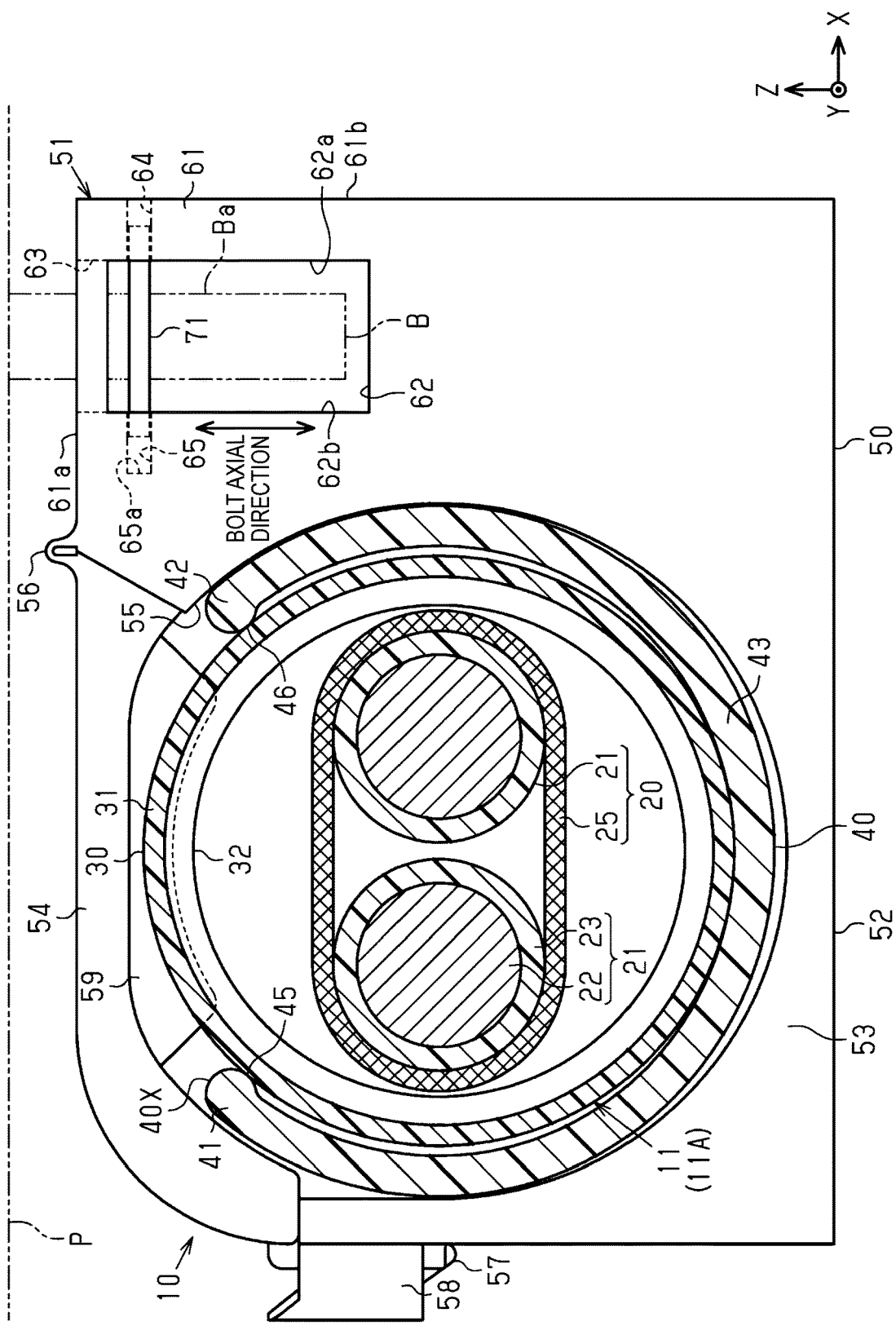
FIG. 2 is a schematic cross-sectional view showing the wire harness according to the embodiment.
Figure 3:
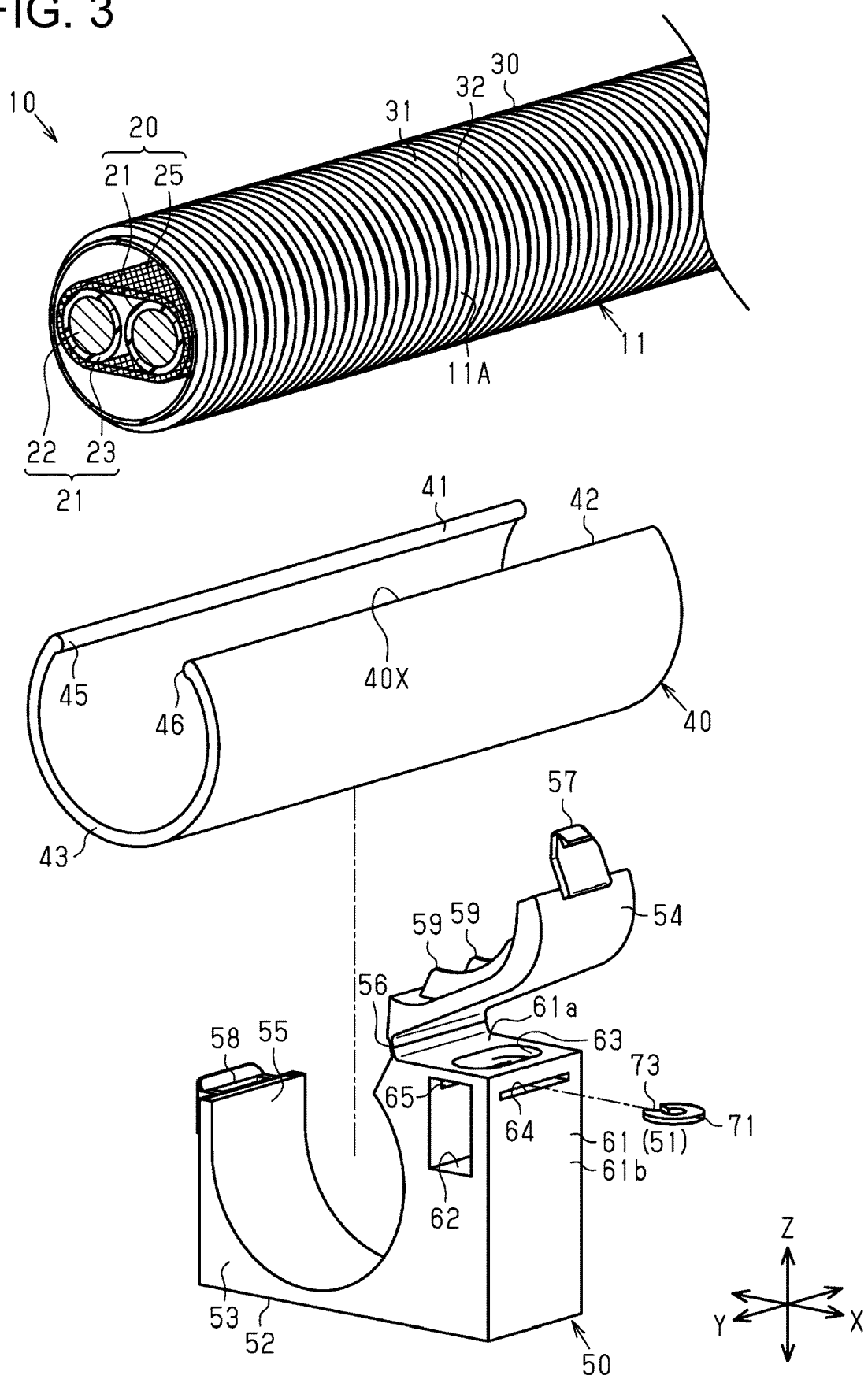
FIG. 3 is a schematic exploded perspective view showing the wire harness according to the embodiment.

As shown in FIGS. 2 and 3, for example, the electric wire member 20 includes one or more electric wires 21, such as two in the present embodiment, and a braided member 25 that collectively encloses the outer circumferential surfaces of the plurality of electric wires 21.

As shown in FIG. 2, each electric wire 21 is a coated electric wire that includes a conductive core wire 22 and an insulating coating 23 that encloses the outer circumferential surface of the core wire 22 and has insulating properties. Each electric wire 21 is, for example, a high-voltage electric wire that withstands a high voltage and a large current. Each electric wire 21 may be, for example, a non-shielded electric wire that does not have an electromagnetic shield structure, or a shielded electric wire that has an electromagnetic shield structure. Each electric wire 21 of the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminum-based material may be used, for example.

The insulating coating 23 covers, for example, all the way around the outer circumferential surface of the core wire 22. The insulating coating 23 is constituted by, for example, a resin material that has insulating properties. The cross-sectional shape of each wire 21 cut along a plane that is orthogonal to the lengthwise direction of each wire 21, that is, the transverse cross-sectional shape of each wire 21, may be any shape. The transverse cross-sectional shape of each electric wire 21 may be, for example, a circular shape, a semicircular shape, a polygonal shape, a square shape, a flat shape, or the like. The transverse cross-sectional shape of each electric wire 21 of the present embodiment is a circular shape.

The braided member 25 has, for example, a tubular shape that collectively encloses the outer circumferences of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminum-based material may be used, for example. Although not shown in the drawings, the two end portions of the braided member 25 in the lengthwise direction are grounded at, for example, the connectors C1 and C2 (see FIG. 1).

Configuration of Exterior Member 30

As shown in FIG. 3, the exterior member 30 has a tubular shape that encloses all the way around the outer circumference of the electric wire member 20. The exterior member 30 of the present embodiment is formed in a cylindrical shape. The exterior member 30 is, for example, provided with a circumferential wall that is formed so as to be continuous all the way around the circumferential surface of the exterior member 30. The exterior member 30 is, for example, sealed all the way around the circumferential surface of the exterior member 30. The exterior member 30 has, for example, a function of protecting the electric wire member 20 from flying objects and water droplets.

The exterior member 30 has, for example, flexibility and is easily bendable. Examples of the flexible exterior member 30 include a resin corrugated tube and a rubber waterproof cover. The exterior member 30 of the present embodiment is a resin corrugated tube having an accordion shape in which large-diameter portions and small-diameter portions are repeatedly formed in the lengthwise direction thereof. In other words, the exterior member 30 of the present embodiment has an accordion structure in which large-diameter portions 31 and small-diameter portions 32 having a smaller diameter than the large-diameter portions 31 are provided alternatingly and continuously along the lengthwise direction of the exterior member 30. Each of the large-diameter portions 31 and the small-diameter portions 32 has, for example, a ring shape that encircles the exterior member 30 once in the circumferential direction. As the material of the exterior member 30, for example, a synthetic resin such as polyolefin, polyamide, polyester, or ABS resin can be used.

Configuration of Path Restricting Member 40

As shown in FIGS. 2 and 3, the wire harness 10 includes a path restricting member 40 (path restrictor) attached to the outer circumference of the exterior member 30. The path restricting member 40 restricts the path along which the wire harness main body 11 is routed. Note that the path restricting member 40 is omitted from FIG. 1.

The path restricting member 40 holds an exterior member 30. The path restricting member 40 is harder than, for example, the exterior member 30. The path restricting member 40 has a hardness that makes it more difficult to bend in a direction orthogonal to the lengthwise direction of the wire harness main body 11 compared to the exterior member 30. Accordingly, the path restricting member 40 restricts the path of the wire harness main body 11. For example, the path restricting member 40 supports the exterior member 30 so that the wire harness main body 11 does not deviate from the desired path by bending due to its own weight or the like. The path restricting member 40 is provided along a portion in the lengthwise direction of the wire harness main body 11. For example, the path restricting member 40 is attached to the outer circumferential surface of a straight section 11A of the exterior member 30, which is a straight section of the path of the wire harness main body 11.

As shown in FIG. 2, the path restricting member 40 covers part of the outer circumference of the exterior member 30 in the circumferential direction of the exterior member 30. The path restricting member 40 has a shape that covers the outer circumference of the exterior member 30 in a portion in the circumferential direction of the exterior member 30. The transverse cross-sectional shape of the path restricting member 40 is C-shaped overall. The path restricting member 40 covers, for example, a range larger than half of the outer circumference of the exterior member 30. That is, the path restricting member 40 covers a range of the outer circumference of the exterior member 30 that is greater than half of the entire outer circumferential surface of the exterior member 30.

The path restricting member 40 extends over the straight section 11A in the lengthwise direction of the exterior member 30. The path restricting member 40 is, for example, formed in a shape extending linearly in one direction. The transverse cross-sectional shape of the path restricting member 40 is, for example, uniform over the entire length in the lengthwise direction of the path restricting member 40.

The path restricting member 40 is made of metal or resin, for example. The path restricting member 40 of the present embodiment is made of resin. As the material of the path restricting member 40, a synthetic resin such as polypropylene, polyamide, or polyacetal may be used, for example. The member 40 may be manufactured using a well-known manufacturing method such as extrusion molding or injection molding, for example. In this embodiment, the path restricting member 40 is made of an extrusion molded article manufactured by extrusion molding. Therefore, the path restricting member 40 can be easily manufactured by using an extruder that extrudes the material of the path restricting member 40 in the lengthwise direction thereof. Furthermore, a single extruder may be used to manufacture two or more types of path restricting members 40 having different lengthwise dimensions. For example, two or more types of path restricting members 40 having different lengthwise dimensions may be manufactured by cutting a base material for path restricting members 40 molded by a single extruder to desired lengths using a cutter.

The path restricting member 40 has an insertion port 40X that is open in a direction orthogonal to the lengthwise direction of the path restricting member 40. This insertion port 40X extends over the entire length in the lengthwise direction of the path restricting member 40. The path restricting member 40 has a first end portion 41 and a second end portion 42, which are the two end portions in the circumferential direction of the path restricting member 40 and form the insertion port 40X. The path restricting member 40 has a connecting portion 43 that connects the first end portion 41 and the second end portion 42. In other words, the path restricting member 40 includes the connecting portion 43, which is formed to partially cover the exterior member 30 in the outer circumferential direction thereof, the first and second end portions 41 and 42 provided at the two ends of the connecting portion 43, and the insertion port 40X defined by the first and second end portions 41 and 42.

The connecting portion 43 forms the main part of the path restricting member 40. The thickness in the radial direction of the connecting portion 43 is, for example, uniform in the circumferential direction of the path restricting member 40. The transverse cross-sectional shape of the connecting portion 43 is formed, for example, in a shape that extends along the outer surface of the exterior member 30. The transverse cross-sectional shape of the first end portion 41, the second end portion 42, and the connecting portion 43 is formed in an arc shape, for example.

The first end portion 41 and the second end portion 42 are provided opposite to each other in the circumferential direction of the path restricting member 40. The first end portion 41 and the second end portion 42 are provided spaced apart from each other across the insertion port 40X in the circumferential direction of the path restricting member 40. In other words, the gap between the first end portion 41 and the second end portion 42 in the circumferential direction of the path restricting member 40 is formed as the insertion port 40X. As described above, the path restricting member 40 is formed in a C shape having the insertion port 40X in a portion in the circumferential direction of the path restricting member 40.

The transverse cross-sectional shapes of the top ends of the first end portion 41 and the second end portion 42 are formed in curved shapes. The transverse cross-sectional shapes of the top ends of the first end portion 41 and the second end portion 42 of the present embodiment are formed in curved shapes.

The path restricting member 40 has a protruding portion 45 that protrudes from the inner surface of the first end portion 41 and a protruding portion 46 that protrudes from the inner surface of the second end portion 42. Both of the protruding portions 45 and 46 protrude toward the exterior member 30 inserted into the path restricting member 40 and come into contact with the outer surface of the exterior member 30. The protruding portions 45 and 46 are in contact with the outer surfaces of the large-diameter portions 31 of the exterior member 30. The protruding portion 45, for example, protrudes from the inner surface of the leading end of the first end portion 41. The protruding portion 46, for example, protrudes from the inner surface of the leading end of the second end portion 42. The transverse cross-sectional shape of each of the protruding portions 45 and 46 is formed, for example, into a curved shape. The transverse cross-sectional shape of each of the protruding portions 45 and 46 of the present embodiment is formed in an arc shape.

As shown in FIG. 3, each of the protruding portions 45 and 46 extends in the lengthwise direction of the path restricting member 40. Each of the protruding portions 45 and 46 extends over the entire length in the lengthwise direction of the path restricting member 40.

Each of the protruding portions 45 and 46 presses the exterior member 30 from the outside of the exterior member 30. The exterior member 30 is elastically sandwiched by the protruding portions 45 and 46 and the connecting portion 43. As a result, the connection of the path restricting member 40 to the exterior member 30 is strengthened.

As shown in FIG. 2, the opening width of the insertion port 40X, that is, the shortest distance between the first end portion 41 and the second end portion 42 is smaller than the outer diameter of the exterior member 30.

The opening width of the insertion port 40X increases as the path restricting member 40 is elastically deformed. For example, the opening width of the insertion port 40X is increased by inserting the exterior member 30 through the insertion port 40X in the direction orthogonal to the lengthwise direction of the first path restricting member 40. When the exterior member 30 is inserted into the path restricting member 40, the path restricting member 40 elastically returns to restore its original shape. As a result, the opening width of the insertion port 40X becomes smaller than the outer diameter of the exterior member 30, thereby attaching the path restricting member 40 to the outer circumference of the exterior member 30.

Configuration of Fixing Member 50

As shown in FIG. 2, the wire harness 10 includes a fixing member 50 for fixing the wire harness main body 11 to a panel P that constitutes the floor of the vehicle V. One or more fixing members 50 are provided in the lengthwise direction of the wire harness main body 11. Note that the fixing member 50 is omitted from view in FIG. 1. The fixing member 50 holds the part of the wire harness main body 11, for example, where the path restricting member 40 is attached.

The fixing member 50 is made of metal or resin, for example. The fixing member 50 of the present embodiment is made of resin. As the material of the fixing member 50, a synthetic resin such as polypropylene, polyamide, or polyacetal may be used, for example. The fixing member 50 may be manufactured using a known manufacturing method such as injection molding, for example.

As shown in FIGS. 2 and 3, the fixing member 50 includes a bolt fixed portion 51 fixed to a bolt B that extends from the panel P, and a holder portion 52 (holder) that holds the electric wire main body 11.

Configuration of Holder Portion 52

The holder portion 52 holds the path restricting member 40 in a manner covering the entire circumference thereof. The holder portion 52 includes a holder portion main body 53 and a lid portion 54 coupled to the holder portion main body 53.

The holder portion main body 53, for example, covers the outer circumference of the connecting portion 43 of the path restricting member 40. The holder portion main body 53 includes an insertion opening 55 covered by the lid portion 54. The insertion opening 55 is open in a direction orthogonal to the lengthwise direction of the wire harness main body 11. Note that the transverse cross-sectional shape of the inner surface of the lid portion 54 is formed, for example, in a shape conforming to the outer surface of the exterior member 30.

The lid portion 54 is formed in one piece with, for example, the holder portion main body 53. The lid portion 54 is connected with the holder portion main body 53, for example, with a hinge portion 56. The lid portion 54 can rotate about the hinge portion 56 as the axis of rotation between an open position and a closed position in which the lid portion 54 covers the insertion opening 55. Note that the lid portion 54 is shown in the closed position in FIG. 2 and in the open position in FIG. 3.

The lid portion 54 also includes a latch claw 57. The latch claw 57 latches on the lock portion 58 provided in the holder portion main body 53 when the lid portion 54 is in the above-described closed position. As a result, the lid portion 54 is held in the closed position. It should be noted that the wire harness main body 11 is held in the holder portion 52 in such a manner that the insertion port 40X faces the lid portion 54.

As shown in FIGS. 2 and 3, the holder portion 52 includes projections 59 that protrude on the side of the inner circumference, that is, toward the wire harness main body 11. The projections 59 are formed to protrude, for example, from the inner surface of the lid portion 54 of the holder portion 52. One or more projections 59 are provided in this embodiment.

When the lid portion 54 is in the closed position, the projections 59 are positioned inside of the insert port 40X of the path restricting member 40. In this way, the projections 59 can restrict the rotation of the path restricting member 40 relative to the holder portion 52. Moreover, the projections 59 fit into the small-diameter portions 32 of the exterior member 30. As such, the exterior member 30 is restricted from moving with respect to the holder portion 52 in the lengthwise direction of the exterior member 30.

Configuration of Bolt Fixed Portion 51

The bolt fixed portion 51 includes a fixed portion main body 61 and a lock ring 71 attached to the fixed portion main body 61.

Figure 4:
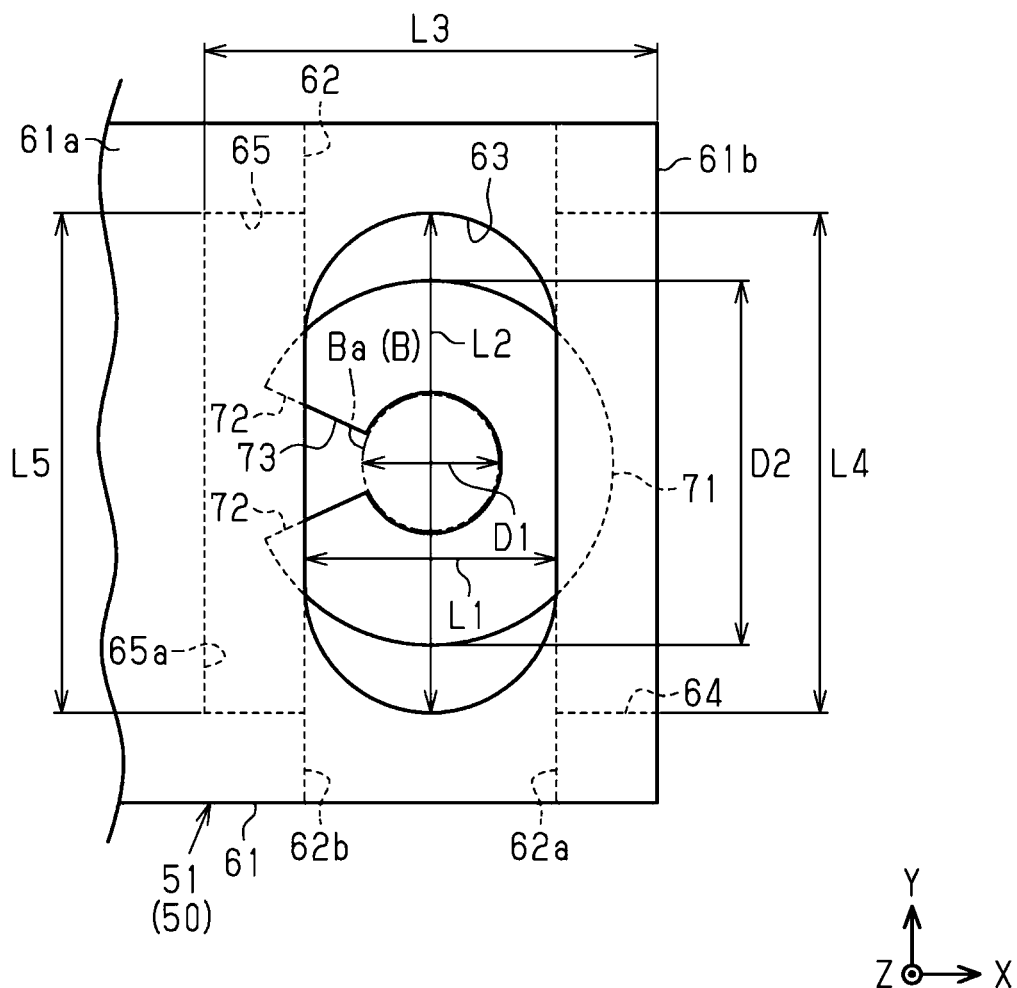
FIG. 4 is an enlarged schematic plan view of a portion in the vicinity of the bolt fixed portion of the wire harness according to the embodiment.

The fixed portion main body 61 is formed in one piece with the holder portion main body 53, for example. The fixed portion main body 61 includes an insertion hole 62 into which the bolt B is inserted. Note that FIGS. 2, 3, and 4 show a width direction X, a depth direction Y, and a height direction Z of the fixing member 50 that are three directions orthogonal to each other. The bolt B is inserted through the insertion hole 62 along the height direction Z. Furthermore, the wire harness main body 11 is disposed in the holder portion 52 so that its lengthwise direction is parallel to the depth direction Y.

As shown in FIG. 2, the fixed portion main body 61 includes a first side face 61a that opposes the panel P when attached to the vehicle V. The insertion hole 62 is open in the height direction Z on one end thereof in the first side surface 61a. That is, the insertion hole 62 includes, in the first side face 61a, a bolt insertion hole 63 into which the bolt B is inserted. Note that the insertion hole 62 of the present embodiment is open on the two sides thereof along the depth direction Y.

The fixed portion main body 61 includes a second side face 61b that intersects the first side face 61a. The second side face 61b is, for example, orthogonal to the first side face 61a. The second side face 61b is opposite in the width direction X to the side face where the holder portion 52 is provided.

As shown in FIGS. 2 and 4, the insertion hole 62 includes a first inner wall surface 62a and a second inner wall surface 62b that oppose each other in the width direction X. The fixed portion main body 61 includes a ring insertion hole 64 (movement restrictor) that places the second side face 61b in communication with the first inner wall surface 62a. The ring insertion hole 64 is open in the second side face 61b, for example, in the width direction X, which is orthogonal to the height direction Z. That is, the ring insertion hole 64 places the inside of the insertion hole 62 in communication with the outside of the fixed portion main body 61 in the width direction X.

The fixed portion main body 61 includes a recessed portion 65 (movement restrictor) in the second inner wall surface 62b of the insertion hole 62. Part of the lock ring 71 is inserted into the recessed portion 65. The recessed portion 65 is provided at the same level as the ring insertion hole 64 in the height direction Z.

Configuration of Lock Ring 71

The lock ring 71 is formed, for example, in a C-shape as seen in the height direction Z. That is, the lock ring 71 has a pair of end portions 72 and a bolt assembly opening 73 between the pair of end portions 72. In addition, the lock ring 71 is formed, for example, in a flat tabular shape in the height direction Z. The outer shape of the lock ring 71 is, for example, approximately circular. The lock ring 71 is made of, for example, resin or metal.

When assembling the fixing member 50 and the bolt B, the bolt B is first inserted into the insertion hole 62 via the bolt insertion opening 63 in the height direction Z.

Then, the lock ring 71 is attached to the bolt B in the insertion hole 62. The lock ring 71 is inserted in the width direction X into the insertion hole 62 via the ring insertion hole 64. During this process, the bolt B is inserted in the inner circumference of the lock ring 71 along the radial direction of the lock ring 71 via the bolt assembly opening 73. When the bolt B is inserted into the bolt assembly opening 73, the bolt B widens the gap between the pair of end portions 72. Subsequently, upon insertion of the bolt B into the inner circumference of the lock ring 71, the lock ring 71 elastically returns to its original shape. Note that the inner diameter of the lock ring 71 is set slightly smaller than the diameter D1 of the threaded portion Ba on the outer circumferential surface of the bolt B. That is, the lock ring 71 elastically pinches the bolt B.

Additionally, the lock ring 71 locks, in an axial direction, to the threaded portion Ba on the outer circumferential surface of the bolt B. That is, the lock ring 71 is caught on the threaded portion Ba in the axial direction, thereby fixing the lock ring 71 to the bolt B in the axial direction.

In this way, with the lock ring 71 fixed to the bolt B, part of the lock ring 71 is located in the ring insertion hole 64. As a result, the lock ring 71 is capable of abutting against the inner surfaces of the ring insertion hole 64 in the height direction Z. Therefore, the inner surfaces of the ring insertion hole 64 restrict the relative movement of the lock ring 71 in the height direction Z.

Moreover, with the lock ring 71 fixed to the bolt B, part of the lock ring 71 is located in the recessed portion 65. As a result, the lock ring 71 is capable of abutting against the inner surfaces of the recessed portion 65 in the height direction Z. Therefore, the inner surfaces of the recessed portion 65 restrict the relative movement of the lock ring 71 in the height direction Z. Note that, according to the present embodiment, both the ring insertion hole 64 and the recessed portion 65 restrict the relative movement of the lock ring 71 to either side in the height direction Z.

The lock ring 71 is configured to be movable in directions orthogonal to the axis of the bolt B in the insertion hole 62.

As shown in FIG. 4, a dimension L1 of the bolt insertion opening 63 in the width direction X and a dimension L2 of the bolt insertion opening 63 in the depth direction Y are larger than the diameter D1 of the threaded portion Ba. As a result, with the bolt B inserted in the bolt insertion hole 63, the bolt B and the lock ring 71 are allowed to move in directions orthogonal to the bolt axis.

A distance L3 in the width direction X from the inner surface 65a of the recessed portion 65 to the open end on the second side face 61b of the ring insertion hole 64 is larger than the outer diameter D2 of the lock ring 71. Furthermore, a dimension L4 of the ring insertion hole 64 in the depth direction Y is larger than the outer diameter D2 of the lock ring 71. Furthermore, a dimension L5 of the recessed portion 65 in the depth direction Y is larger than the outer diameter D2 of the lock ring 71. Note that the dimension L4 of the ring insertion hole 64 and the dimension L5 of the recessed portion 65 are, for example, set to be the same. These dimensional settings ensure a region inside the insertion hole 62 including the ring insertion hole 64 and the recessed portion 65, in which the lock ring 71 fixed to the bolt B can perform relative movement in the direction orthogonal to the axis of the bolt B.

The effects of the present embodiment will now be described.

(1) The bolt fixed portion 51 includes the fixed portion main body 61 with the insertion hole 62, into which the bolt B is inserted. Additionally, the bolt fixed portion 51 includes the lock ring 71, which is fixed to the bolt B by locking, in an axial direction, to the threaded portion Ba of the bolt B disposed in the insertion hole 62. The insertion hole 62 includes the ring insertion hole 64 and the recessed portion 65, which restrict the relative movement of the lock ring 71 in the axial direction of the bolt B. Furthermore, the lock ring 71 is configured to be movable in the insertion hole 62 in directions orthogonal to the axis of the bolt B, that is, the width direction X, the depth direction Y, and composite directions thereof.

According to this configuration, the lock ring 71 fixed to the bolt B is restricted from relative movement in the axial direction of the bolt B by the ring insertion hole 64 and the recessed portion 65, and therefore the bolt B can remain inserted in the insertion hole 62. Additionally, the lock ring 71 is configured to be movable in directions orthogonal to the axis of the bolt B in the insertion hole 62. That is, the bolt B and the lock ring 71 are allowed to move relative to the fixing member 50 in directions orthogonal to the bolt axis. Therefore, even if the position of the fixing member 50 is displaced with respect to the bolt B in a direction orthogonal to the axis of the bolt B due to the displacement of the path of the wire harness 10, it is possible to stabilize the fixing of the fixing member 50 to the bolt B.

(2) The lock ring 71 is configured to be movable in the insertion hole 62 both in the width direction X, which is orthogonal to the axial direction of the bolt B, and in the depth direction Y, which is orthogonal to the axial direction of the bolt B and the width direction X. This configuration permits the positional displacement between the bolt B and the fixing member 50 in first and second directions orthogonal to the axial direction of the bolt B. Therefore, it is possible to further stabilize the fixing of the fixing member 50 to the bolt B.

(3) The fixed portion main body 61 includes the ring insertion hole 64, which is in communication with the insertion hole 62 and into which the lock ring 71 can be inserted.

Due to this configuration, the lock ring 71 can be inserted into the insertion hole 62 via the ring insertion hole 64 so as to be fixed to the bolt B in the insertion hole 62.

(4) The lock ring 71 is formed in a C-shape as seen in the axial direction of the bolt B.

According to this configuration, the lock ring 71 can be easily attached to the bolt B.

(5) The wire harness 10 includes the exterior member 30, which covers the outer circumference of the electric wire member 20, and the path restricting member 40, which is attached to the outer circumference of the exterior member 30 and restricts the path of the exterior member 30. The path restricting member 40 has the insertion port 40X, which is open in a direction orthogonal to the lengthwise direction of the path restricting member 40 and extends over the entire length of the path restricting member 40. According to this configuration, it is possible to more stably fix the fixing member 50 to the bolt B in the wire harness 10, which includes the path restricting member 40.

(6) The holder portion 52 holds the path restricting member 40 in a manner that covers the entire circumference of the path restricting member 40. The holder portion 52 has the projections 59 protruding on the inner circumference. The projections 59 are disposed inside of the insert port 40X. According to this configuration, the projections 59 of the holder portion 52 can restrict the rotation of the path restricting member 40 relative to the holder portion 52.

The present embodiment may be implemented with the modifications below. The present embodiment and the modifications below may be implemented in combination to the extent that they are technically compatible.

The external shape of the lock ring 71 may be changed to, for example, an elliptical or polygonal shape.

In the above-described embodiment, the lock ring 71 is flat, but the lock ring 71 is not limited to this. For example, the cross-sectional shape of the lock ring 71 in the radial direction thereof may be configured to be circular or oval.

In the above-described embodiment, the recessed portion 65 can abut against the two sides of the lock ring 71 in the axial direction, but the embodiment is not limited to this. For example, the lock ring 71 may be configured to abut against the recessed portion 65 only in the direction in which the bolt B comes out of the insertion hole 62.

The shape of the inside of the insertion hole 62, in which the lock ring 71 can move, is not limited to the above-described embodiment, but can be changed as appropriate from the above-described embodiment as long as the lock ring 71 can move in directions orthogonal to the axis of the bolt B.

In the bolt fixed portion 51 of the above-described embodiment, only one ring insertion hole 64 is provided, but the present disclosure is not limited to this, and multiple ring insertion holes 64 may be provided, for example, so as to be aligned in the height direction Z.

In the fixing member 50 of the above-described embodiment, the insertion opening 55 of the holder portion main body 53 is configured to face the panel P, and the lid portion 54, which covers the insertion opening 55, is configured to oppose the panel P. However, the fixing member 50 is not particularly limited to this configuration. For example, the insertion opening 55 may be configured to face the opposite direction to the bolt fixed portion 51 in the width direction X.

The structure of the path restricting member 40 of the above-described embodiment can be changed as appropriate. For example, as long as the path restricting member 40 has the insertion port 40X and has a structure that can be attached to the outer circumference of the exterior member 30, there is no particular limitation to the other structures.

The protruding portion 45 of the above-described embodiment may be provided at a position farther away from the insertion port 40X than the top end of the first end portion 41 in the circumferential direction of the path restricting member 40.

The protruding portion 46 of the above-described embodiment may be provided at a position farther away from the insertion port 40X than the top end of the second end portion 42 in the circumferential direction of the path restricting member 40.

The protruding portions 45 and 46 of the above-described embodiment may be partially provided in the lengthwise direction of the path restricting member 40.

At least one of the protruding portions 45 and 46 of the above-described embodiment may be omitted.

In the path restricting member 40 of the above-described embodiment, the thickness in the radial direction of the connecting portion 43 may be changed in the circumferential direction.

The shape of the connecting portion 43 of the path restricting member 40 according to the above-described embodiment is not limited to an arc shape, but can be changed to, for example, an elliptical arc shape, a U shape, or the like.

In the above-described embodiment, the path restricting member 40 is harder than the exterior member 30, but the present disclosure is not limited to this, and the hardness may be less than or equal to that of the exterior member 30. That is, the path restricting member 40 need only operate such that the wire harness main body 11 is less likely to bend than if the path restricting member 40 was not attached thereto.

In the holder portion 52, the projections 59 may be provided on the holder portion main body 53 instead of on the lid portion 54.

The fixing member 50 may hold a portion of the wire harness main body 11 where the path restricting member 40 are not provided. Moreover, the path restricting member 40 may be omitted from the wire harness 10 of the above-described embodiment.

For example, the exterior member 30 of the above-described embodiment may be a resin corrugated tube with a metal layer that contains a metal material, formed on the outer surface thereof.

The exterior member 30 of the above-described embodiment is not limited to being a corrugated tube, and may be an exterior member that is not provided with large-diameter portions 31 or small-diameter portions 32, for example.

The exterior member 30 of the above-described embodiment may have a slit that extends in the lengthwise direction of the exterior member 30.

Although the electric wires 21 of the above-described embodiment are high-voltage electric wires, the present disclosure is not limited thereto. For example, the electric wires 21 may be low-voltage electric wires.

In the electric wire member 20 of the above-described embodiment, an electromagnetic shield member is embodied as the braided member 25. However, the present disclosure is not limited to such a configuration. For example, the electromagnetic shield member of the electric wire member 20 may be embodied as a metal foil.

The braided member 25 may be omitted from the electric wire member 20 of the above-described embodiment.

In the above-described embodiment, the number of electric wires 21 included in the electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate according to the vehicle configuration.

In the above-described embodiment, a plurality of on-board devices to which the wire harness 10 is to be electrically connected are embodied as the inverter M1 and the high-voltage battery M2. However, the present disclosure is not limited to such a configuration. The plurality of on-board devices to which the wire harness 10 is to be electrically connected is not particularly limited as long as they are electric devices to be mounted in the vehicle V.

The exemplary embodiments and modifications disclosed herein are illustrative in all aspects and the present disclosure is not to be limited to these examples. That is, the scope of the present disclosure is indicated by the scope of claims, and is intended to include all modifications within the meaning and scope equivalent to the scope of claims

What is claimed is:

1. A wire harness, comprising:
an electric wire;
a fixing member for fixing the electric wire to an attachment object, wherein:
   the fixing member includes a bolt fixed portion that is fixed to a bolt included in the attachment object and a holder for holding the electric wire,
   the bolt fixed portion includes a fixed portion main body having an insertion hole into which the bolt is inserted via a bolt insertion opening, and a lock ring insertion hole that is separate from the bolt insertion opening; and
   a lock ring that is inserted into the insertion hole via the lock ring insertion hole and that is fixed to the bolt by locking, in an axial direction, to a threaded portion of the bolt disposed in the insertion hole,
   the fixed portion main body restricts relative movement of the lock ring in the axial direction of the bolt at the long ring insertion hole; and
   the entire lock ring is movable in the insertion hole both in a first direction orthogonal to the axial direction of the bolt and a second direction orthogonal to the axial direction of the bolt and the first direction.

2. The wire harness according to claim 1, wherein the lock ring is formed in a C-shape as seen in the axial direction of the bolt.

3. The wire harness according to claim 1, further comprising:
   an exterior tube covering an outer circumference of the electric wire; and
   a path restrictor that is attached to an outer circumference of the exterior tube and restricts a path of the exterior tube,
   wherein the path restrictor has an insertion port that is open in a direction orthogonal to a lengthwise direction of the path restrictor and extends over an entire length in the lengthwise direction of the path restrictor.

4. The wire harness according to claim 3, wherein
   the holder holds the path restrictor in a manner covering an entire circumference of the path restrictor,
   the holder includes a projection protruding on an inner circumference, and
   the projection is positioned inside of the insertion port.

5. The wire harness according to claim 1, wherein
   the fixed portion main body includes a recess on an opposite side of the insertion hole from the lock ring insertion hole such that the lock ring is inserted into the recess via both the lock ring insertion hole and the insertion hole, and
   the fixed portion main body restricts relative movement of the lock ring in the axial direction of the bolt at both the long ring insertion hole and the recess.

* * * * *